United States Patent [19]

Leslie

[11] 3,926,453

[45] Dec. 16, 1975

[54] CARRIER VEHICLE WITH PUSHER-TYPE DOLLY

[75] Inventor: Craig A. Leslie, Milwaukie, Oreg.

[73] Assignee: Pierce Pacific Mfg. Inc., Portland, Oreg.

[22] Filed: Aug. 30, 1974

[21] Appl. No.: 502,008

[52] U.S. Cl. .......................... 280/81 R; 280/150 A
[51] Int. Cl.² ...................................... B62D 61/12
[58] Field of Search ............ 280/150 A, 81 R, 34 R; 214/141; 212/48, 49

[56] References Cited
UNITED STATES PATENTS

| | | | |
|---|---|---|---|
| 3,191,963 | 6/1965 | Prichard............................ | 280/81 R |
| 3,399,785 | 9/1968 | Mork ................................ | 212/48 X |
| 3,479,049 | 11/1969 | Duecy............................... | 280/81 R |
| 3,726,416 | 4/1973 | Pottorf et al..................... | 212/49 |
| 3,822,791 | 7/1974 | Eiler ................................. | 212/49 |

FOREIGN PATENTS OR APPLICATIONS

| 211,297 | 2/1967 | Sweden............................... | 212/49 |
|---|---|---|---|

*Primary Examiner*—M. Henson Wood, Jr.
*Assistant Examiner*—Michael J. Forman
*Attorney, Agent, or Firm*—Kolisch, Hartwell, Dickinson & Stuart

[57] ABSTRACT

A carrier vehicle is disclosed for transporting an elongate massive structure which such extending longitudinally of the carrier vehicle. The carrier vehicle includes dirigible wheels at the forward end for steering, and the elongate massive structure, in a specific embodiment, a boom, has its base mounted adjacent the rear of the carrier vehicle. The boom extends forwardly over the cab for the vehicle at the forward end, to a region located forwardly of the vehicle. A pusher-type dolly disposed forwardly of the vehicle and pushed by the vehicle has means mounting and supporting the weight of the forward end of the boom. The dolly has a frame secured to the carrier vehicle frame to be maintained as a longitudinally aligned extension of the carrier vehicle frame. The dolly frame is vertically displaceable relative to the vehicle frame and the dolly further includes swiveled wheel structure supporting the dolly and riding on the ground.

5 Claims, 4 Drawing Figures

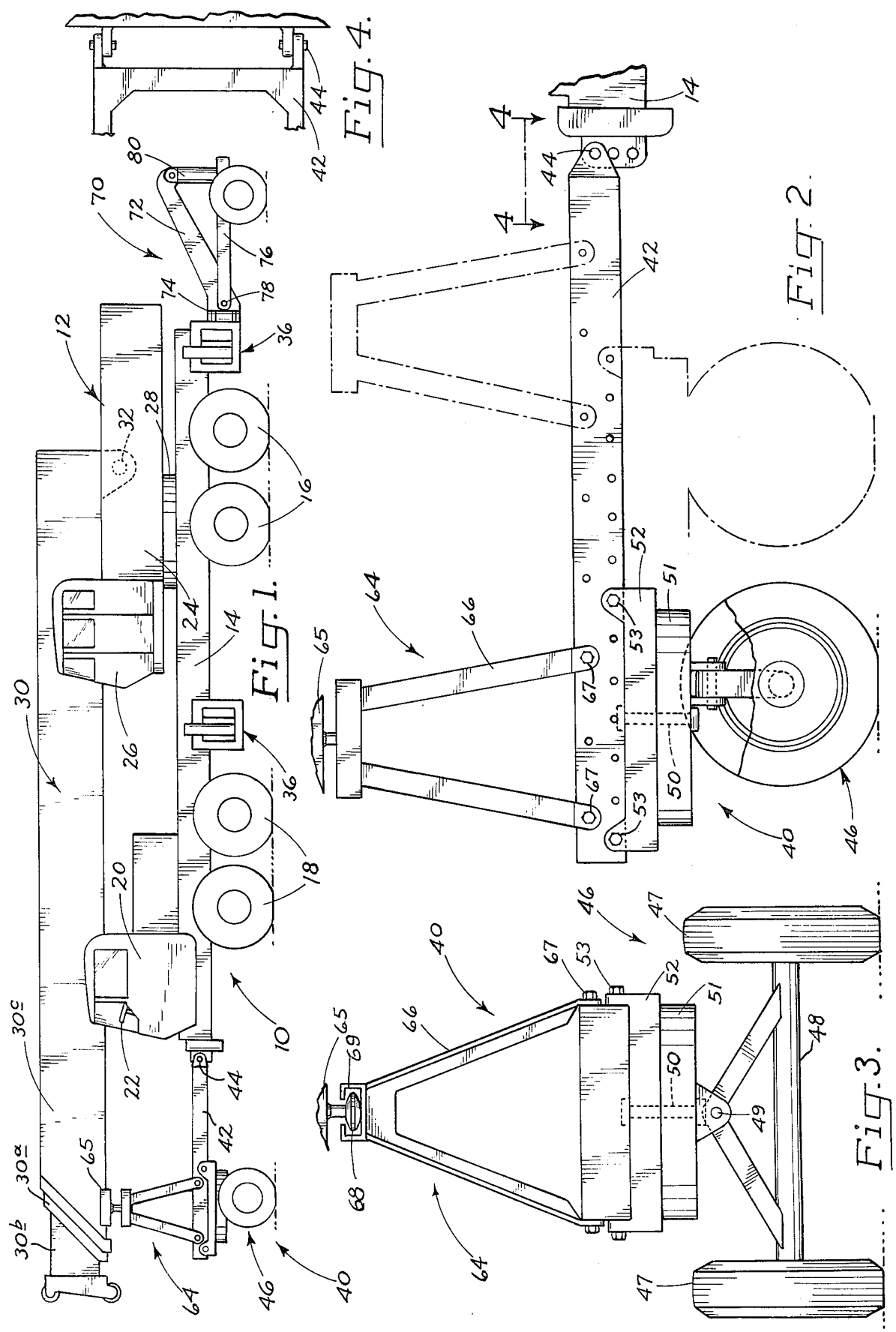

CARRIER VEHICLE WITH PUSHER-TYPE DOLLY

This invention relates to mobile equipment such as mobile cranes, log loaders, yarders and the like, and which are characterized by including a carrier vehicle mounting an elongate boom or other massive structure with the carrier vehicle providing a means for transporting the structure from one location to another.

Describing a specific embodiment of the invention, mobile cranes are known which include a carrier vehicle and a crane on the vehicle which includes a boom provided for load-handling purposes. With the equipment in condition for road transport, the crane may be positioned on the carrier vehicle so that the boom extends either forwardly or rearwardly. Positioning of the boom whereby it extends rearwardly introduces maneuverability problems, and furthermore tends to concentrate the weight of the equipment at the rear introducing problems of rear axle loading. The usual steering axles are located at the forward end of the vehicle, and with the boom positioned to extend forwardly, the steering axles tend to be heavily loaded due to the overhung boom.

A general object of this invention is to provide, in combination with a carrier vehicle, improved means for supporting equipment mounted on the vehicle when the equipment and vehicle are readied for road transport.

More particularly, the invention concerns a carrier vehicle and equipment combination, which features a pusher-type dolly disposed forwardly of the forward end of the carrier vehicle and the dirigible wheels in such vehicle, providing at least a portion of the support for the boom or other equipment in the combination.

According to one embodiment of the invention the carrier vehicle may be additionally provided with a load distribution device at the rear of the vehicle, i.e., trailing the vehicle, which is effective to support a portion of the total weight of the vehicle and equipment combination. The device is adjustable to transfer the load carried by the carrier vehicle generally forwardly, to produce a new load distribution pattern in the vehicle combination. With the organization described, and with the pusher-type dolly effective to provide support for the combination in advance of the dirigible wheels, it is possible to produce a load distribution pattern wherein the load is distributed over the various axles and wheels supporting them in a manner best to enable the vehicle to come within existing highway regulations with respect to axle loading.

Another object is to provide a carrier vehicle and equipment combination, which includes a pusher-type dolly disposed forwardly of the front end of the carrier vehicle, with the dolly having a frame which is maintained as a longitudinally aligned forward extension of the vehicle frame. The forward end of the dolly frame is vertically displaceable, whereby the vehicle combination is enabled to move over uneven surfaces. The boom or other structure which is supported on the carrier vehicle extends forwardly and has its forward extremity supported on a cradle provided in the dolly. In the combination the rear end of the boom or other structure is mounted through pivot structure on the frame of the carrier vehicle, whereby the forward end may move up and down with vertical displacement of the dolly.

In a preferred embodiment of the invention it is contemplated that the dolly have swiveled wheel structure supporting it for movement over the ground. With the dolly frame maintained as a longitudinally aligned extension of the carrier vehicle frame, this permits the vehicle combination to be steered.

These and other objects and advantages are attained by the invention which is described hereinbelow in conjunction with the accompanying drawings, wherein:

FIG. 1 is a side elevation showing a carrier vehicle and crane combination, with the boom in the crane supported on a dolly at the forward end of the vehicle;

FIG. 2 is an enlarged view of the dolly;

FIG. 3 is a front elevation of the dolly shown in FIG. 2; and

FIG. 4 is a view taken along the line 4—4 in FIG. 2.

In the specific embodiment of the invention illustrated, a carrier vehicle is shown generally at 10 which has mounted thereon a crane 12 including a boom 30. The vehicle and crane combination, sometimes referred to in the art as a mobile crane, typifies the equipment with which the concepts of the present invention may be utilized. It should be understood, however, that the invention also is applicable to other organizations, such as log loaders, yarders, oil service equipment, etc., which include elongate massive structure such as booms, towers or masts adapted for transport through their mounting on a carrier vehicle.

The carrier vehicle includes the usual frame, shown at 14, wheels 16 supporting the rear of the frame for movement over the ground, such ordinarily be power driven, and wheels 18 supporting the forward end of the vehicle. The latter ordinarily are dirigible wheels utilized in steering the vehicle. Shown disposed at the forward end of the vehicle is an operator's cab 20 having within it the usual steering wheel 22 and other controls required in driving the carrier vehicle over the highway.

The crane 12 includes a crane frame 24 supporting an operator's cab 26 mounted through turntable mechanism 28 on vehicle frame 12. Boom 30 in the crane is what is sometimes referred to as a squirt boom, since such includes multiple extensible sections such as those shown at 30a, 30b which may be extended outwardly from the main boom section 30c to elongate the boom. The base of the main boom section is mounted on crane frame 24 through a boom pivot pin 32. Suitable means is provided in the crane to raise and lower the boom under power through vertical upward and downward swinging of the boom about the pivot axis provided by pin 32. Controls for raising and lowering the boom, extending the various boom sections, and turning the crane about the vertical axis provided by turntable mechanism 28, are located within cab 26.

The crane is stabilized during its use as a load-handling agency by extending outrigger mechanisms such as those shown at 36 provided on opposite sides of the vehicle, at locations disposed forwardly and rearwardly of rear wheels 16.

With the crane readied for transport on the carrier vehicle, the crane is positioned as shown in FIG. 1, so that boom 30 in the crane extends forwardly to a position overhanging cab 20, and is in substantially longitudinal alignment with the longitudinal axis of the carrier vehicle. As contemplated herein, the mass of the forward end of the boom is supported by a dolly shown generally at 40, which is positioned forwardly of vehicle 10, and which is pushed by the vehicle when moving over the road.

Dolly 40 includes a dolly frame 42 which has a rear extremity joined to vehicle frame 14. Specifically, the connection of the dolly frame with the vehicle frame includes pivot means 44 which accommodates up and down swinging of the dolly frame but which maintains the dolly frame as a longitudinally aligned extension of the vehicle frame. The up and down movement described is to accommodate variations in road level encountered as the vehicle travels over the ground.

The dolly is supported for movement over the ground by dolly wheel means 46 which may include, as in the specific embodiment illustrated, a pair of wheels 47 mounted on an axle 48 supported through a center point suspension 49 on lower caster frame 51. Lower caster frame 51 is swiveled at 50 on upper caster frame 52. By reason of the swiveled mounting so provided, when the carrier vehicle negotiates a turn wheels 47 of the wheel means 46 are enabled to swing in the direction of the turn. Preferably and as illustrated in FIG. 2, the upper caster frame is mounted on dolly frame 42 by means such as detachable fasteners 53 permitting the caster frame to be mounted at different adjusted positions along the length of the dolly frame. In this way, the spacing between dolly wheel means 46 and the forward dirigible wheels 18 may be adjusted, to effect a change in the amount of the load supported by the dolly.

Dolly 40 supports a means mounting and receiving load from boom 30, comprising a boom rest or cradle 64. Such includes a pad portion 65 secured to the boom, and an upstanding boom rest frame 66 detachably connected to dolly frame 42 by fasteners 67. A shoe 68 carried at the base of pad portion 65 is received within slide structure 69 provided at the top of frame 66. The shoe and slide structure afford a limited amount of fore and aft movement of the pad relative to frame 66, as well as transverse rocking movement of the pad relative to frame 66. During road travel, the means for raising and lowering the boom is adjusted so as to accommodate free up and down swinging of the boom with respect to boom pivot pin 32. With the carrier vehicle and dolly moving over an uneven road surface, the shoe and slide structure described accommodate the relative displacements expected between the forward end of the boom and frame 66.

The carrier vehicle as shown in FIG. 1 is further provided at the rear thereof with an axle load distributing device shown generally at 70 which functions to provide additional support for the mass of the carrier vehicle and crane combination, and also to shift a portion of the mass of this combination forwardly so as to relieve the loading of the rear axle means in the vehicle. This redistribution of the load as effected by the distribution device produces a load distribution pattern wherein part of the load which has been shifted is supported by the dolly wheel means 46 of dolly 40.

The axle load distributing device 70 comprises what is referred to as a cantilever member 72 which is connected to the rear part of vehicle frame 14 by a hinge 74 which permits side-to-side swinging of the cantilever member but inhibits vertical swinging movement relative to vehicle frame 14. A frame 76 connected by pivot means 78 to the cantilever member is permitted up and down swinging movement with respect to the cantilever member. A fluid-operated assembly 80 exerts a downward bias on frame 76 with respect to the rear end of the cantilever member. The means providing fluid-operated assembly 80 with fluid under pressure in the carrier vehicle is such that the downward biasing of the means 80 is constant or substantially so, irrespective of the relative position of frame 76 with respect to the cantilever member. With the organization described, and depending upon the amount of downward bias exerted by fluid-operated means 80, a portion of the load is in effect lifted by the load distributing device 70 to relieve the rear axles of the carrier vehicle of load and to shift load forwardly on the carrier vehicle.

It should be obvious from the above description that an organization is described which permits the road transport of a boom or other elongate massive structure without such trailing the vehicle so as to introduce maneuvering problems, and without overloading of the steering axles of the carrier vehicle. A load distribution pattern may be selected which optimumly shares the load of the vehicle and crane between the various wheel axles of the vehicle, the load distribution device and the dolly at the forward end of the vehicle.

It is claimed and desired to secure by Letters Patent:

1. In combination with a carrier vehicle including a vehicle frame and wheel support for said frame, said wheel support including dirigible wheels at the forward end for steering the vehicle,
   - an elongate structure supported by said carrier vehicle extending longitudinally thereof and having the forward end thereof disposed forwardly of the forward end of said carrier vehicle and the dirigible wheels supporting said forward end,
   - a cradle supporting the underside of the forward end of said structure,
   - a dolly mounting said cradle disposed forwardly of the vehicle and pushed by the vehicle, said dolly including a dolly frame and swiveled wheel structure supporting the dolly frame and riding on the ground, and
   - means securing the dolly frame to the vehicle frame accommodating relative vertical displacement of the dolly frame relative to the vehicle frame with the dolly frame maintained as a longitudinally aligned extension of the vehicle frame.

2. The combination of claim 1 which further comprises an axle load distribution device trailing the carrier vehicle including wheel support and means for biasing the wheel support downwardly to transfer a load forwardly on the carrier vehicle.

3. The combination of a carrier vehicle including a vehicle frame and having wheel support for said frame including dirigible wheels for steering at the forward end of the vehicle,
   - a fluid-operated axle load distributing device trailing the carrier vehicle including wheel support and fluid-operated means for biasing said wheel support of the device downwardly to transfer a load forwardly on the carrier vehicle,
   - a dolly disposed forwardly of the vehicle and pushed by the vehicle, said dolly including a dolly frame and swiveled wheel structure supporting the dolly frame and riding on the ground,
   - means securing said dolly frame to the vehicle frame maintaining the dolly frame as a longitudinally aligned extension of the vehicle frame by accommodating relative vertical displacement of the dolly frame with respect to the vehicle frame, and an elongate load imparting structure carried by said carrier vehicle having a forward end disposed over said dolly, said dolly having means mounting and receiving load from said load imparting structure.

4. The combination of a carrier vehicle including a vehicle frame having wheel support for said frame including dirigible wheels for steering at the forward end of the vehicle, an operator's cab disposed at the forward end of the vehicle including controls for said dirigible wheels, an elongate adjustable boom having the base thereof mounted on said vehicle frame adjacent the rear thereof and positionable to extend longitudinally of the vehicle whereby its forward end extends over said cab at a region located forwardly of the forward end of the vehicle, the mounting for the base of the boom accommodating vertical displacement of the forward end of the boom relative to the vehicle, a dolly disposed forwardly of the vehicle including a dolly frame and means securing the frame to the vehicle frame maintaining the dolly frame as a longitudinally aligned extension thereof, said means accommodating relative vertical displacement of the dolly frame relative to the vehicle frame, said dolly having swiveled wheel structure supporting the dolly and riding on the ground, said dolly further having means mounting the forward end of the boom and receiving load imparted by the forward end of the boom, said mounting means accommodating movement of the boom in a longitudinal direction relative to the dolly frame.

5. The combination of claim 4, which further comprises an axle load distribution device trailing the carrier vehicle including wheel support and means for biasing the wheel support of the device downwardly to transfer a load forwardly on the carrier frame.

* * * * *